Patented Oct. 3, 1922.

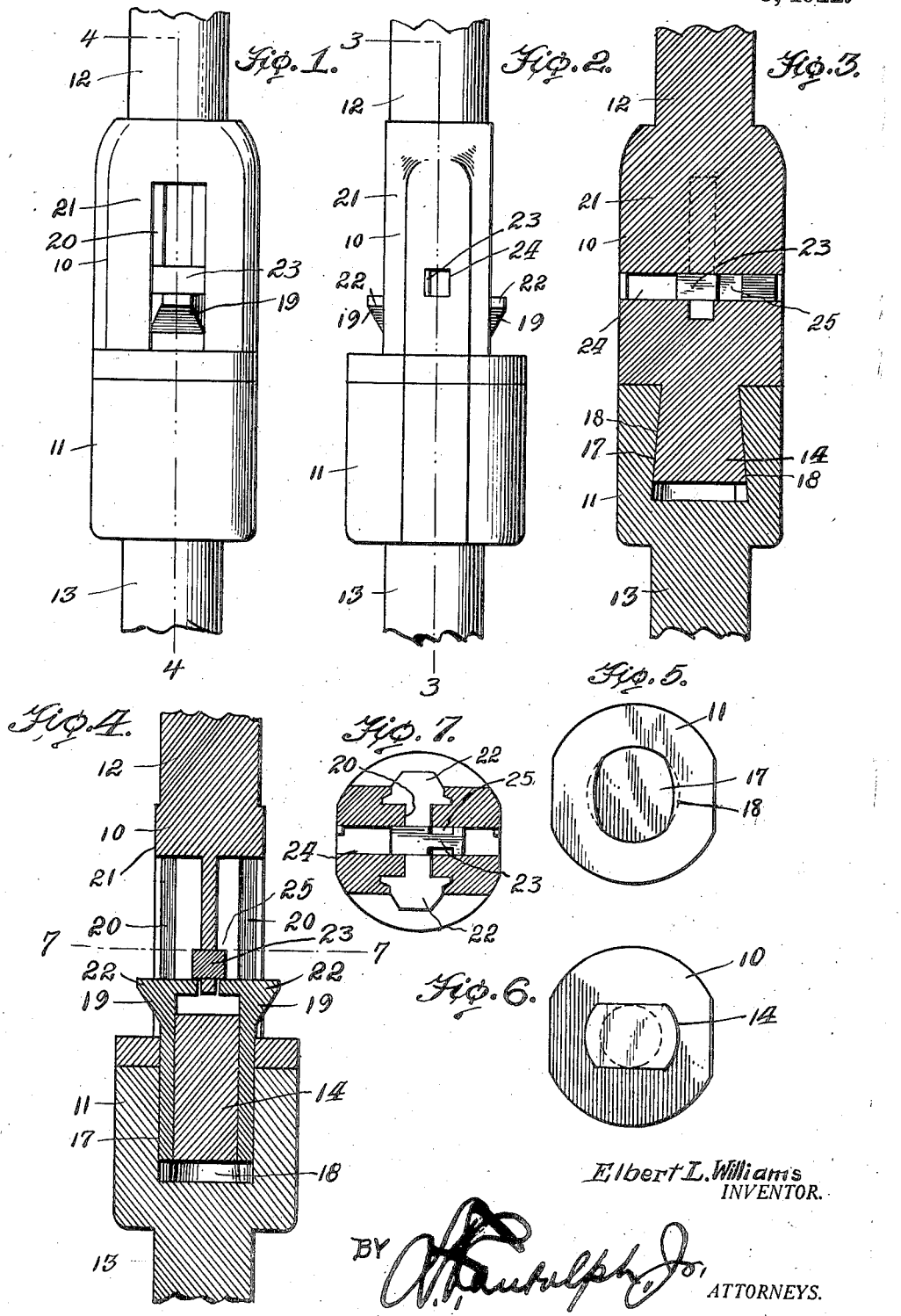

1,431,072

UNITED STATES PATENT OFFICE.

ELBERT L. WILLIAMS, OF FORT MADISON, IOWA, ASSIGNOR OF ONE-HALF TO ROY A. MERTENS, OF FORT MADISON, IOWA.

ROD COUPLING.

Application filed September 6, 1921. Serial No. 498,712.

*To all whom it may concern:*

Be it known that I, ELBERT L. WILLIAMS, a citizen of the United States, residing at Fort Madison, in the county of Lee and State of Iowa, have invented certain new and useful Improvements in a Rod Coupling; and I do hereby declare the following to be a full, clear, and exact description of the invention, such as will enable others skilled in the art to which it appertains to make and use the same.

The object of the invention is to provide a simple and efficient construction of rod coupling which, while designed primarily for use in connection with the sucker rods of pumps and the like, is equally adapted for use in connection with drill rods and like devices wherein facility of coupling is desirable and permanency of engagement as against accidental displacement, while affording resistance against tensile, compression and rotary strains, is necessary, and with these objects in view the invention consists in a construction, combination and relation of parts of which a preferred embodiment is shown in the drawing, wherein:

Figure 1 is a side view of a coupling embodying the invention as applied to sucker or drill rods or any equivalent thereof.

Figure 2 is an edge view at right angles to the plane of Figure 1.

Figure 3 is a sectional view on the plane indicated by the line 3—3 of Figure 2.

Figure 4 is a similar view on the plane indicated by the line 4—4 of Figure 1.

Figure 5 is an end view of the female or socket member of the coupling.

Figure 6 is a similar view of the male or stud member of the coupling.

Figure 7 is a transverse section on the plane indicated by the line 7—7 of Figure 4.

The coupling consists essentially of the male and female members 10 and 11 which are carried respectively by the adjacent ends of rod sections 12 and 13, said members being adapted for engagement by a relative longitudinal movement thereof and being of such construction as to be interlocked by a relative rotary movement thereof. To this end the male member is provided with a stud 14 which is enlarged toward its extremity, as for example progressively as indicated, the same being tapered toward its inner end or point of juncture with the rod and being round at its base and flattened at its end above the same at opposite sides to provide a substantially elliptical form in cross section; while the socket member is provided with a seat 17 for the reception of said stud, the seat being undercut at diametrically opposite sides as shown at 18 for the reception of the enlarged extremity of the stud member and being of uniform diameter in a plane at right angles to the undercut portion to permit of the longitudinal or endwise seating of the stud in the socket. After the stud has been seated in the socket a relative rotary movement through an angle of ninety degrees will bring the enlarged diametrical portion of the stud into interlocking engagement with the diametrically under cut portion of the seat, so as to provide against longitudinal displacement or disengagement of the members until a further rotary movement thereof has been effected to secure registration of the major diameter of the stud with the clearance or cut away portion of the seat.

To prevent such further rotary movement necessary to unlock or permit of the disengagement of the members of the coupling there are provided sliding keys 19 mounted in the guides 20 formed in an enlarged portion 21 of the male member of the coupling and having finger holds 22 by which they may readily be manipulated. These keys are normally housed within the guides of the male member but after the proper relative adjustment of the male and female members of the coupling has been effected, the keys may be advanced to engage the same with the cut away portions of the seats provided to permit of the longitudinal engagement of the stud with the seat, and obviously as long as these keys remain extended and in position to occupy the cut away portions of the seat, the relative rotary movement of the coupling members is prevented and the disengagement of the coupling members is rendered impossible. These locking keys also perform the function of reinforcing the joint between the members of the coupling, and while they may readily be displaced to permit of the disengagement of the coupling members, the accidental release thereof is prevented.

As an additional means of security, particularly to prevent possible displacement of the keys 19, a locking bolt 23 is fitted in a transverse guide opening 24 in the enlargement of the rod, said guide being disposed to intersect the guides 20, as will be seen clearly by reference to Figure 4, to adapt the bolt to overlie the inner portions of the heads or finger holds of the keys and thus hold the latter in their depressed or engaging position. Reduced intermediate portions of the bolt may be arranged in the plane of the keys to permit of the movement of the latter, the reduced portion being shown at 25 and constituting notches at opposite sides of the bolt. When the bolt is arranged with this reduced portion out of registration with the keys, the latter are locked in position.

Having thus described the invention, what I claim is:—

1. A rod coupling having male and female members of which the former is provided with a stud for engagement with a seat in the latter and are of rotatively interlocking construction, and means for locking the said members against relative rotary movement, and consisting of a longitudinally slidable key carried by one member for engagement with the other, and a transversely slidable lock bolt for arrangement in the path of movement of said key.

2. A rod coupling having male and female members of which the former is provided with a stud for engagement with a seat in the latter and are of rotatively interlocking construction, and means for locking the said members against relative rotary movement, and consisting of a longitudinally slidable key carried by one member for engagement with the other, and a transversely slidable lock bolt for arrangement in the path of movement of said key, said bolt being provided with a reduced portion for registration with the key to permit sliding and disengagement movement thereof.

In testimony whereof I affix my signature in presence of two witnesses.

ELBERT L. WILLIAMS.

Witnesses:
E. M. SNELL,
H. C. SHAW.